(No Model.) 2 Sheets—Sheet 1.
J. S. McGEHEE.
HOISTING DEVICE.
No. 560,145. Patented May 12, 1896.
Fig. I.
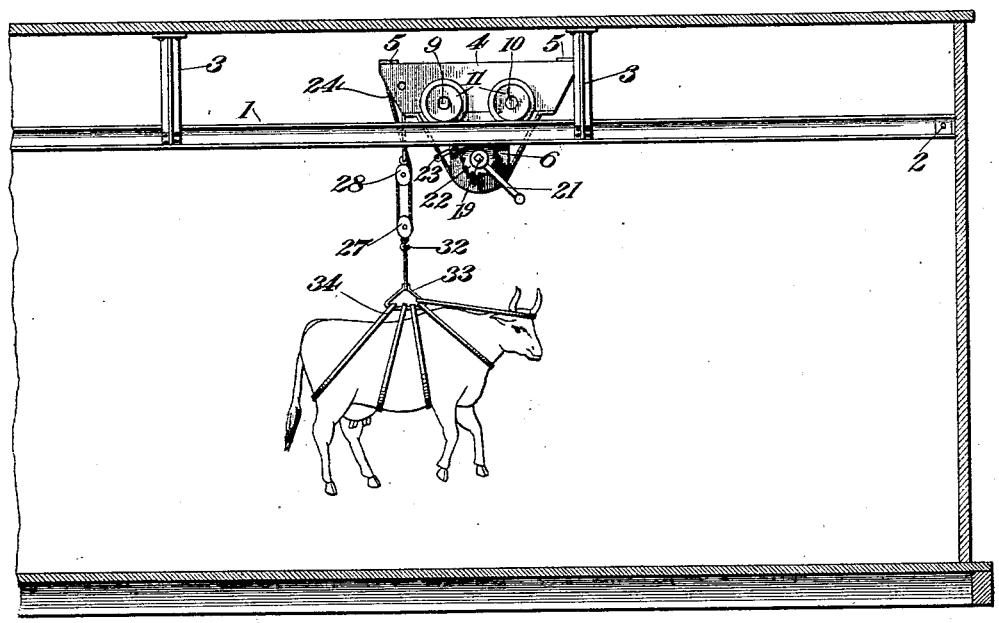
Fig. III.
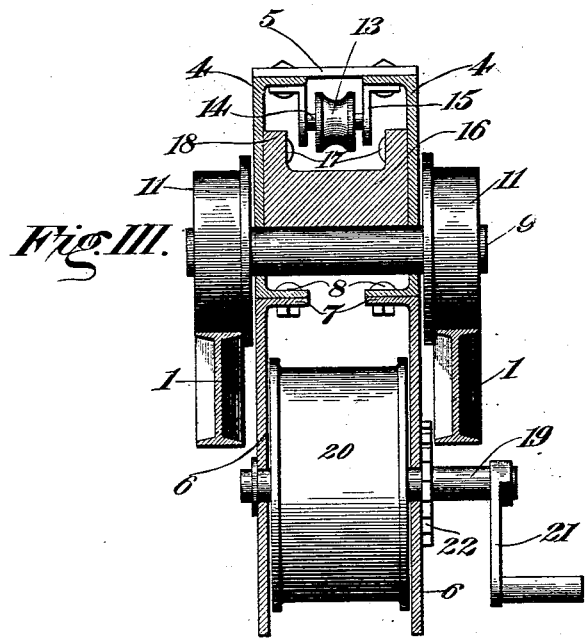
Witnesses
M. E. Fowler
Inventor
John Scott McGehee
By Joseph L. Atkins
Attorney.

(No Model.) 2 Sheets—Sheet 2.
J. S. McGEHEE.
HOISTING DEVICE.
No. 560,145. Patented May 12, 1896.
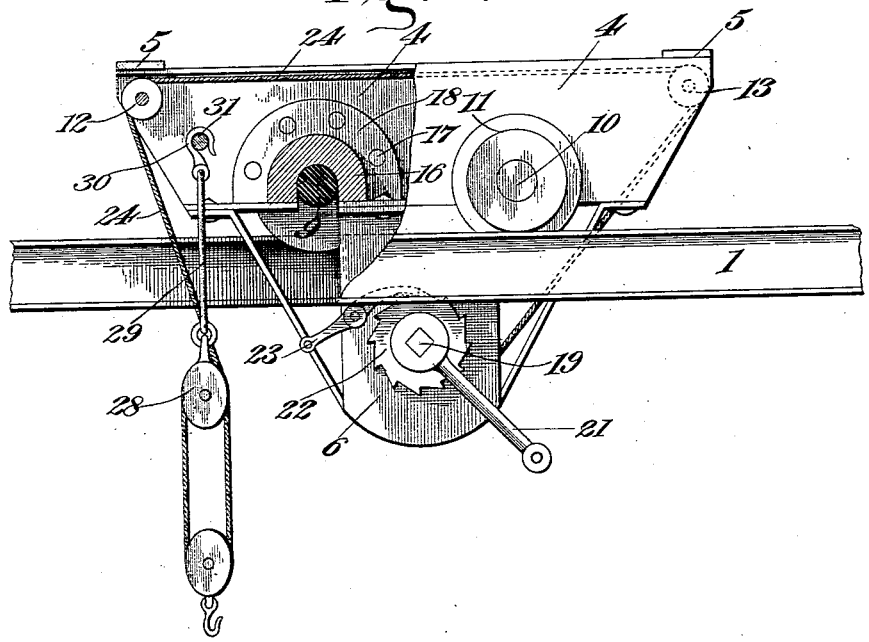
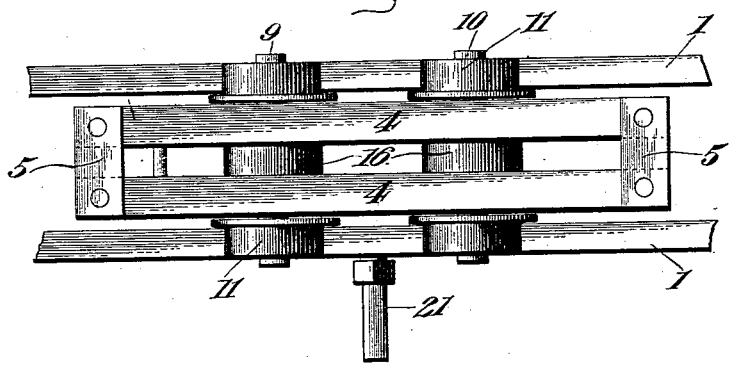
Witnesses
M. E. Fowler
S. M. Acker
Inventor
John Scott McGehee
By Joseph L. Atkins
Attorney

UNITED STATES PATENT OFFICE.

JOHN SCOTT McGEHEE, OF NEW ORLEANS, LOUISIANA.

HOISTING DEVICE.

SPECIFICATION forming part of Letters Patent No. 560,145, dated May 12, 1896.

Application filed June 17, 1895. Serial No. 553,096. (No model.)

*To all whom it may concern:*

Be it known that I, JOHN SCOTT McGEHEE, of New Orleans, parish of Orleans, State of Louisiana, have invented a certain new and useful Hoisting Device, of which the following is a specification, reference being had to the accompanying drawings.

The object of my invention is to produce an improved traveling hoist adapted for lifting and transporting sick cattle in a car. It is designed to be placed in stock-cars for the purpose of lifting an animal when it is down and transporting the animal to another part of the car.

The mortality of cattle in transit is very great, owing to the fact that weak cattle, becoming tired of standing, lie down and are trampled upon by those which remain standing until they are unable to get up. By my invention I propose to lift such cattle and keep them suspended until they regain their strength, or, if several are down, to lift them and transport them to one end of the car, thereby separating them from the stronger cattle and protecting them from injury by being trampled upon.

In the accompanying drawings, Figure I is a side elevation of a portion of a car equipped with my hoist. Fig. II is a view of the hoist with a portion broken away. Fig. III is a transverse section of the same through one of the truck-shafts and wheels and through the hoisting-drum and shaft. Fig. IV is a top plan view of the subject-matter of Fig. II.

Referring to the figures on the drawings, 1 indicates a track, which may be composed of a pair of I-iron beams secured, as by bolts 2, to the opposite ends of a car and supported intermediately by hangers 3, secured at intervals to the beam and to the ceiling of the car.

4 indicates the two sides of a truck, which may be made of channel-iron and united together, as by terminal cross-pieces 5, bolted or riveted to the upper flanges of the channel-iron side pieces.

6 indicates the side pieces of a pendent drum-support, having flanges 7, through which, as by bolts or rivets 8, they are secured to the bottom flanges of the side pieces 4.

9 and 10 indicate shafts passing through the opposite side pieces 4 and carrying on their opposite ends, respectively, outside of the side pieces, flange-wheels 11, that ride upon the track 1. The drum-support is sufficiently narrow to depend between the tracks and extends below them to a sufficient distance to bring the drum and its operating mechanism within easy reach of a person standing upon the floor of the car.

12 and 13 indicate grooved guide-pulleys located, respectively, at opposite ends of the truck, between the side pieces 4. Each is preferably carried upon an axle 14, revoluble in bearings in brackets 15, bolted or riveted to the under sides of the upper flanges of the side pieces 4.

16 indicates spacing-blocks located between the side pieces 4. They are preferably inversely U-shaped and straddle, respectively, the shafts 9 and 10, being secured to the side pieces, as by bolts or rivets 17, passing through flanges 18, formed on the opposite ends of the spacing-blocks. The side pieces 6 carry in suitable bearings an axle 19, to which is secured, between the side pieces 6, a winding-drum 20. On one end of the axle a crank-handle 21 is secured, and in proximity to the adjacent side pieces a fixed ratchet-wheel 22 is provided upon the axle 19, with which the pawl 23, pivoted to one of the side pieces, engages.

24 indicates a rope secured at one end to the drum 20, around which it is wound, and passing around the pulleys 12 and 13 is operatively wound upon the sheaves of ordinary blocks 27 and 28. The block 28 may be provided with an arm 29 and a hook 30, that is adapted to hook over a rod 21, carried in the side pieces 4, and to constitute a swinging support. (See Fig. II.) The block 27 carries a hook 32, which is in practice designed to be secured to a clevis 33, which is designed to support any suitable cattle-sling—such, for example, as the one shown in Fig. I of the drawings and indicated at 34.

In practice the truck is shifted over the locality in which an animal to be moved lies and the sling is adjusted upon the animal. The pawl 23 is disengaged from the ratchet 22, and the rope 24 is unwound from the drum until the hook 32 can be fastened to the clevis 33. The crank is then turned until the animal is lifted from its feet, a backward movement of the crank being prevented by the engagement of the pawl 23 with the ratchet. When the animal is sufficiently elevated, the truck may be pushed upon the track 1 until its burden is shifted to the proper position, when the drum may be unwound and the animal released, if desired.

As illustrated, the truck, with its pendent support, is of a general triangular shape, so that the blocks 27 and 28 may hang from one corner of the truck in proximity to the crank where the operator stands, while the opposite end of the truck extends as a counterbalancing-weight in the opposite direction. This particular form of truck and the relative arrangement of the drum and guide-pulleys not only insure the stability of the truck upon the tracks, but permit the raising of the animal sufficiently high without interfering with the manipulation of the drum-actuating mechanism, which, as before explained, projects a considerable distance below the track, and which I find to be essential to the use to which my device is adapted to be put.

What I claim is—

1. In a hoisting apparatus, the combination with a truck-frame and its supporting-wheels, of a drum below and intermediate of the wheels, guide-pulleys above the wheels, a swinging support carried by the truck-frame, a block carried by the swinging support, and a rope passing around the drum, guide-pulleys and block, substantially as specified.

2. In a hoisting apparatus, the combination with a truck-frame and pendent support, of supporting-wheels, guide-pulleys and a drum above and below the wheels, respectively, and arranged in a triangle, a swinging support carried by the truck-frame and supporting a block to one side of the drum, a second block provided with a hook, a rope wound around the drum passing over the guide-pulleys and around the blocks, a crank for actuating the drum, and pawl-and-ratchet mechanism designed to dog said drum, substantially as specified.

3. A truck-frame for a hoisting apparatus consisting of side pieces 4, inversely U-shaped supporting-blocks located between the side pieces and designed to straddle the shafts, and depending side pieces 6 bolted to the first-named side pieces, substantially as specified.

4. The combination with a triangular carriage having its upper sides substantially horizontal, of a drum located at the lower angle of the carriage, guide-pulleys at the upper corners of the carriage, a pendent support depending from one extremity of the carriage and provided with a block, a rope passing around the drum, the guide-pulleys and the block sustained by the pendent support, and a second block carried by the rope below the first block, substantially as specified.

In testimony of all which I have hereunto subscribed my name.

JOHN SCOTT McGEHEE.

Witnesses:
CHAS. PAYNE FENNER,
SAML. HENDERSON, Jr.